United States Patent
Ng et al.

(10) Patent No.: US 10,981,227 B2
(45) Date of Patent: *Apr. 20, 2021

(54) ADDITIVE MANUFACTURING WITH GAS DELIVERY AND DISPENSER ON COMMON SUPPORT

(71) Applicant: Applied Materials, Inc., Santa Clara, CA (US)

(72) Inventors: Hou T. Ng, Campbell, CA (US); Nag B. Patibandla, Pleasanton, CA (US); Ajey M. Joshi, San Jose, CA (US); Bharath Swaminathan, San Jose, CA (US); Ashavani Kumar, Sunnyvale, CA (US); Eric Ng, Mountain View, CA (US); Bernard Frey, Livermore, CA (US); Kasiraman Krishnan, Milpitas, CA (US)

(73) Assignee: Applied Materials, Inc., Santa Clara, CA (US)

(*) Notice: Subject to any disclaimer, the term of this patent is extended or adjusted under 35 U.S.C. 154(b) by 411 days.

This patent is subject to a terminal disclaimer.

(21) Appl. No.: 15/941,955

(22) Filed: Mar. 30, 2018

(65) Prior Publication Data

US 2018/0221953 A1    Aug. 9, 2018

Related U.S. Application Data

(63) Continuation of application No. 15/211,872, filed on Jul. 15, 2016, now Pat. No. 10,668,533.

(60) Provisional application No. 62/194,156, filed on Jul. 17, 2015.

(51) Int. Cl.
| | |
|---|---|
| *B22F 3/10* | (2006.01) |
| *B22F 3/105* | (2006.01) |
| *B29C 64/153* | (2017.01) |
| *B22F 3/00* | (2021.01) |
| *B29C 64/371* | (2017.01) |
| *B29C 64/364* | (2017.01) |
| *B23K 26/342* | (2014.01) |
| *B23K 26/70* | (2014.01) |
| *B33Y 30/00* | (2015.01) |
| *B33Y 10/00* | (2015.01) |

(52) U.S. Cl.
CPC ............ *B22F 3/1055* (2013.01); *B22F 3/008* (2013.01); *B23K 26/342* (2015.10); *B23K 26/703* (2015.10); *B29C 64/153* (2017.08); *B29C 64/364* (2017.08); *B29C 64/371* (2017.08); *B22F 2003/1056* (2013.01); *B22F 2201/02* (2013.01); *B22F 2201/50* (2013.01); *B22F 2999/00* (2013.01); *B33Y 10/00* (2014.12); *B33Y 30/00* (2014.12); *Y02P 10/25* (2015.11)

(58) Field of Classification Search
CPC .. B22F 3/10; B22F 3/1055; B22F 2003/1056; B23K 26/703; B29C 64/153; B33Y 10/00; B33Y 30/00; Y02P 10/295

USPC .......................................................... 419/55
See application file for complete search history.

(56) References Cited

U.S. PATENT DOCUMENTS

| | | | |
|---|---|---|---|
| 6,193,923 | B1 | 2/2001 | Leyden et al. |
| 6,215,093 | B1 | 4/2001 | Meiners et al. |
| 6,696,664 | B2 | 2/2004 | Pyritz et al. |
| 7,067,021 | B2 | 6/2006 | Fujita et al. |
| 7,261,542 | B2 | 8/2007 | Hickerson et al. |
| 7,326,377 | B2 | 2/2008 | Adams |
| 8,718,522 | B2 | 5/2014 | Chillscyzn et al. |
| 9,776,362 | B2 | 10/2017 | Chuang et al. |
| 9,956,612 | B1 | 5/2018 | Redding et al. |
| 2003/0075836 | A1 | 4/2003 | Fong |
| 2007/0241482 | A1 | 10/2007 | Giller et al. |
| 2014/0263209 | A1 | 9/2014 | Burris et al. |
| 2015/0041025 | A1 | 2/2015 | Wescott et al. |
| 2016/0136731 | A1 | 5/2016 | Mcmurtry et al. |
| 2017/0014906 | A1 | 1/2017 | Ng et al. |
| 2017/0120330 | A1 | 5/2017 | Sutcliffe et al. |
| 2017/0216916 | A1 | 8/2017 | Nyrhilä et al. |
| 2019/0366434 | A1 | 12/2019 | Upadhye et al. |

FOREIGN PATENT DOCUMENTS

| | | |
|---|---|---|
| CN | 206169294 | 5/2017 |
| EP | 2001656 | 12/2008 |
| JP | 3621703 | 2/2005 |
| JP | 2007-021747 | 2/2007 |
| JP | 2015-104837 | 6/2015 |
| WO | WO 92/08592 | 5/1992 |
| WO | WO 2015/056230 | 4/2015 |
| WO | WO 2015/170330 | 11/2015 |
| WO | WO 2017/013454 | 1/2017 |

OTHER PUBLICATIONS

International Search Report and Written Opinion in International Application No. PCT/US2016/042627, dated Oct. 24, 2016, 12 pages.
European Supplementary Search Report in European Application No. 16828330.7, dated Apr. 4, 2019, 8 pages.

*Primary Examiner* — Edward M Johnson
(74) *Attorney, Agent, or Firm* — Fish & Richardson P.C.

(57) ABSTRACT

An additive manufacturing system includes a platen having a top surface, a support structure, a powder dispenser coupled to the support structure and positioned above the platen and configured to deliver a powder in a linear region that extends along a first axis, a gas dispenser coupled to the support structure in a fixed position relative to the powder dispenser and having an outlet to deliver a gas across the outermost layer of feed material, an energy source configured to selectively fused the layer of powder, and an actuator coupled to the support to move the support with the powder dispenser and the gas dispenser together along a second axis perpendicular to the first axis and parallel to the top surface such that the linear region and the outlet sweep along the second axis to deposit the powder in a swath over the platen and deliver the gas.

13 Claims, 8 Drawing Sheets

ADDITIVE MANUFACTURING WITH GAS DELIVERY AND DISPENSER ON COMMON SUPPORT

CROSS REFERENCE TO RELATED APPLICATIONS

This application is a continuation of U.S. application Ser. No. 15/211,872, filed Jul. 15, 2016, which claims priority to U.S. Provisional Patent Application No. 62/194,156, filed on Jul. 17, 2015, each of which is hereby incorporated by reference.

TECHNICAL FIELD

This invention relates to additive manufacturing, and more particularly to a 3D printing process in which a layer of feed material is dispensed and cooled.

BACKGROUND

Additive manufacturing (AM), also known as solid freeform fabrication or 3D printing, refers to any manufacturing process where three-dimensional objects are built up from raw material (generally powders, liquids, suspensions, or molten solids) in a series of two-dimensional layers or cross-sections. In contrast, traditional machining techniques involve subtractive processes and produce objects that are cut out of a stock material such as a block of wood or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains, e.g., powders, to create objects. Sintering usually involves heating a powder. When a powdered material is heated to a sufficient temperature in a sintering process, the atoms in the powder particles diffuse across the boundaries of the particles, fusing the particles together to form a solid piece. In contrast to melting, the powder used in sintering need not reach a liquid phase. As the sintering temperature can be lower than the melting point of the material, sintering is often used for materials with high melting points, such as tungsten and molybdenum.

Both sintering and melting can be used in additive manufacturing. The material being used determines which process occurs. An amorphous solid, such as acrylonitrile butadiene styrene (ABS), is actually a supercooled viscous liquid, and does not technically "melt" in the sense of a phase transition from a solid to a liquid state (the term "melt" is otherwise used in a conventional sense herein). Selective laser sintering (SLS) is the relevant process for ABS, while selective laser melting (SLM) is used for crystalline and semi-crystalline materials such as nylon and metals, which have a discrete melting/freezing temperature and undergo melting during the SLM process.

Conventional systems that use a laser beam as the energy source for sintering or melting a powdered material typically direct the laser beam to a selected point in a layer of the powdered material and raster scan the laser beam while selectively activating the laser to fuse desired locations across the layer. Once all the desired locations on the first layer are sintered or melted and re-solidified, a new layer of powdered material is deposited on top of the completed layer and the process is repeated layer by layer until the desired object is produced.

An electron beam can also be used as the energy source to cause sintering or melting in a material. Once again, the electron beam is raster scanned across the layer to complete the processing of a particular layer.

SUMMARY

In one aspect, an additive manufacturing system includes a platen having a top surface to support an object being manufactured, a feed material dispenser to deliver a plurality of successive layers of feed material over the platen, an energy source positioned above the platen to fuse at least a portion of an outermost layer of feed material, and a coolant fluid dispenser to deliver a coolant fluid onto the outermost layer of feed material after at least a portion of the outermost layer has been fused.

Implementations may include one or more of the following features.

The coolant fluid dispenser may include a conduit configured to deliver coolant fluid simultaneously across a width of the platen. The system may include an actuator coupled to the conduit to move the conduit along a length of the platen. The conduit may include a plurality of spaced apart apertures extending across the width of the platen or a contiguous slot extending across the width of the platen.

The energy source may be configured to apply heat to a region that scans at least along the length of the platen, and the system may configured to cause the actuator to move the conduit in conjunction with motion of the region along the length of the platen. The energy source may be configured to generate a beam that scans in both length and width directions across the outermost layer of feed material. The energy source comprises a laser. The energy source may be configured to simultaneously heat an area of the outermost layer of feed material that extends across a width of the platen. The energy source comprises a linear array of heat lamps. The conduit and energy source may be supported in a fixed position relative to each other on a movable frame. A second actuator may move the region relative to the platen, and the controller may be configured to cause the actuator to move the conduit in conjunction with motion caused by the second actuator.

A controller may be configured to cause the actuator to move the conduit across the platen after the energy source has heated the layer of feed material. The energy source is configured to simultaneously heat all of the outermost layer of feed material. The energy source may include an array of heat lamps.

The feed material dispenser may be configured to distribute feed material to a region that scans at least along the length of the platen, and the system is configured to cause the actuator to move the conduit in conjunction with motion of the region along the length of the platen. The feed material dispenser may include at least one of a spreader to push feed material from a reservoir adjacent the platen, or a distributor out of which material is delivered. The conduit and spreader or distributor may be supported in a fixed position relative to each other on a movable frame. A second actuator may move the spreader or distributor relative to the platen, and the controller may be configured to cause the actuator to move the conduit in conjunction with motion caused by the second actuator.

The platen may be suspended in a chamber, and the coolant fluid dispenser may be configured to inject the coolant fluid into the chamber.

In another aspect, a method of additive manufacturing includes successively forming a plurality of layers on a support. Forming a layer from the plurality of layers include dispensing a layer of feed material over a platen, fusing at least a portion of the layer of feed material, and delivering a coolant fluid onto the layer of feed material after at least a portion of the layer has been fused.

The throughput of an additive manufacturing system can be increased by including a coolant dispenser that dispenses coolant fluid onto a layer of sintered feed material. The coolant fluid cools the layer of sintered feed material, and expedites the processing of the next layer of feed material. The coolant fluid also reduces temperature fluctuations in feed material which improves the quality of the additive manufacturing process.

DETAILED DESCRIPTION

An additive manufacturing process can involve dispensing a layer of feed material, for example, a powder, on a platen or a previously deposited layer, followed by a method to fuse portions of the layer of feed material. In the case of a powder, one or more energy sources can heat up the feed material from room temperature to a temperatures sufficient to fuse the material, e.g., a sintering temperature or melting temperature. The processed layer needs to cool before the next layer is dispensed, e.g., so that the sintered or melted material re-solidifies and/or to prevent accidental sintering or melting of the next layer.

Cooling of the layer feed material can be expedited by dispensing a coolant fluid from a coolant dispenser onto the fused feed material. Expediting cooling improve the throughput of the system and the quality of the additive manufacturing process. The coolant dispenser can traverse over a layer of deposited feed material and dispense coolant fluid on the entire layer or a portion of the layer. The additive manufacturing process can also include a sensor to detect the temperature of the surface of deposited feed material and a control system to regulate the coolant dispenser based on the signal from the sensor.

In general, the additive manufacturing system can include a platen to receive feed material, a feed material dispenser, one or more heat sources that can heat the deposited feed materials, and a coolant dispenser to dispense coolant fluid onto the deposited feed material. The heat sources can include a beam source, a heat lamp array, and/or resistive heater coils that are embedded in the platen. Components of the feed material dispenser, the beam from the beam source, and the coolant dispenser can move relative to one another or in conjunction with one another (i.e., are fixed relative to each other in operation) as they traverse across the platen to deposit, fuse and cool, respectively, the feed material.

Figure 1A:
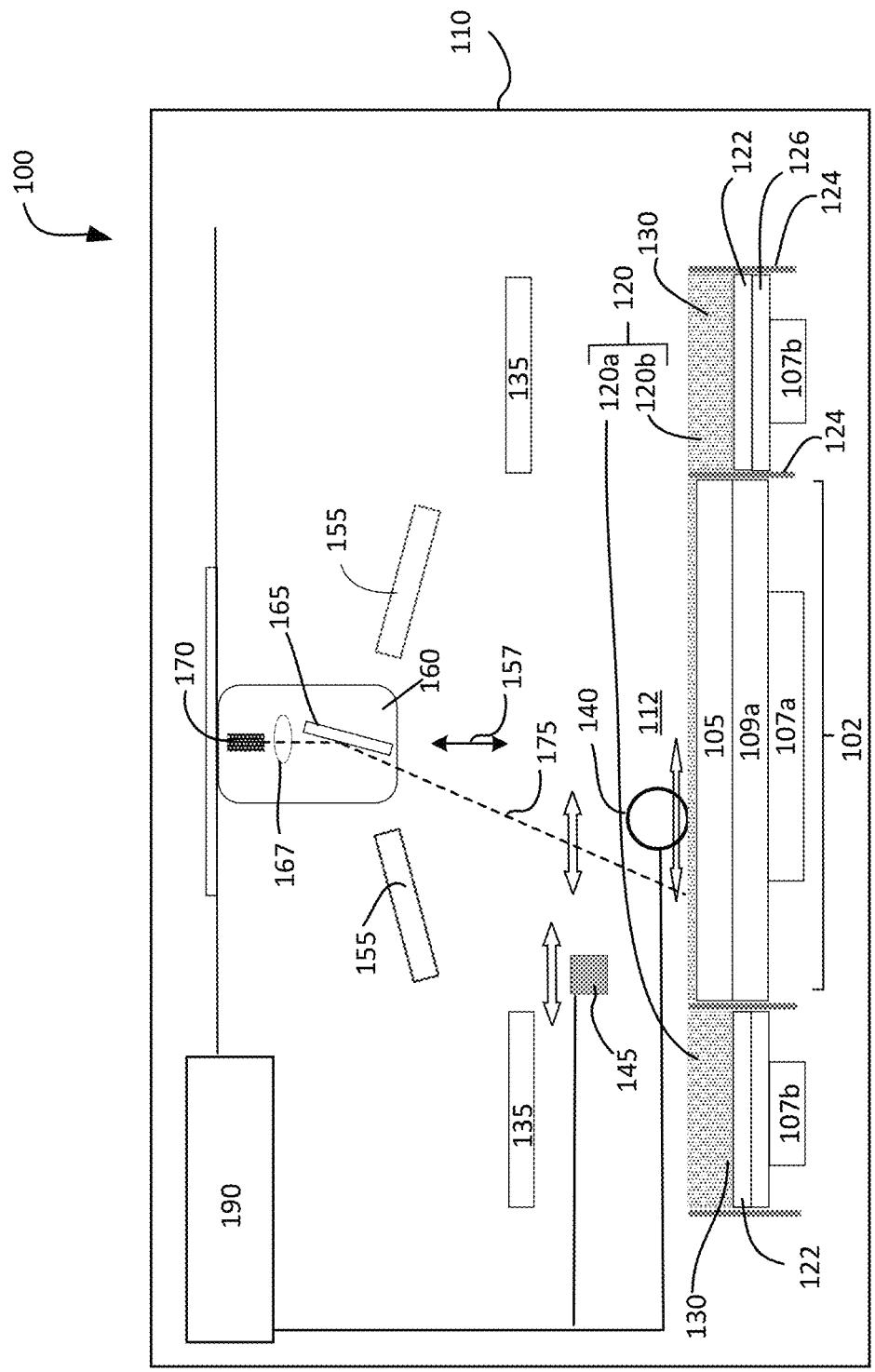
FIGS. 1A and 1B are schematic side views of embodiments of additive manufacturing systems.
Figure 1B:
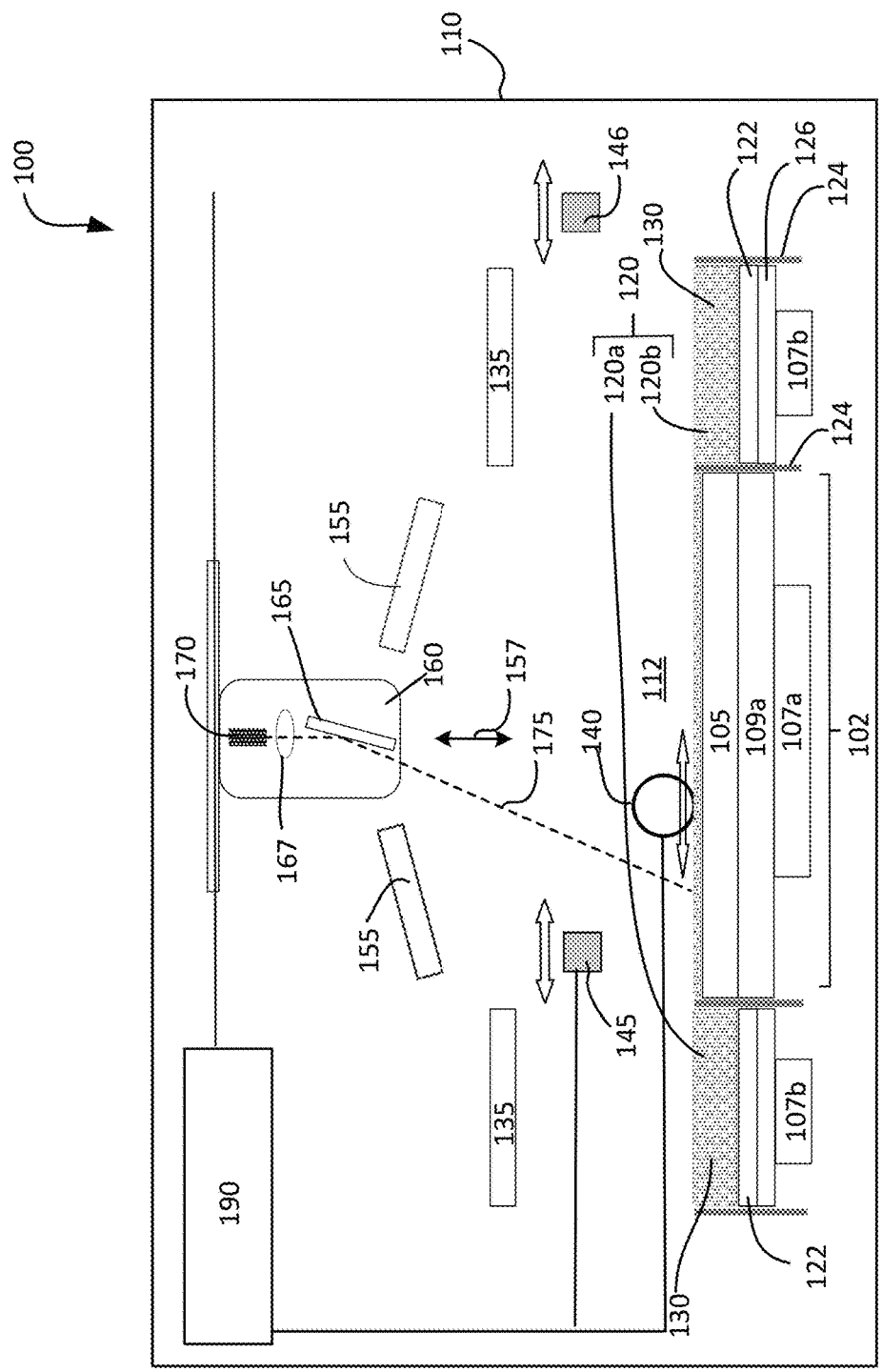

FIGS. 1A and 1B are side views of implementations of an additive manufacturing system 100. The additive manufacturing system 100 includes a support 102 to hold the object being fabricated, a feed material delivery system to deliver a layer of feed material over the support 102, a first heat source 155, such as an array of heat lamps, configured to heat the entire layer of feed material, a second heat source 160 configured to generate a beam 175 to scan across the layer of feed material and selectively heat portions of the layer of feed material sufficiently to fuse the feed material, and coolant dispensers 145 and 146 (see FIG. 1B) to control the temperature of the feed material deposited over the support 102.

Optionally, some parts of the additive manufacturing system 100 can be enclosed by a housing 110. The housing 110 can, for example, allow a vacuum environment to be maintained in a chamber 112 inside the housing, e.g., pressures at about 1 Torr or below. Alternatively the interior of the chamber 112 can be a substantially pure gas, e.g., a gas that has been filtered to remove particulates, or the chamber can be vented to atmosphere.

The support 102 can include a platen 105 that is vertically movable, e.g., by a linear actuator 107a that is connected to the platen 105. In addition, the support can include a heater, such as a resistive heater embedded in the platen 105 or a lower lamp array 109a below the platen, to heat the platen and the feed material 130 that has been deposited on the platen 105.

The feed material delivery system delivers the feed material from a reservoir to the platen. For example, in the case of a powder, the feed delivery system can dispense a layer of power across the support, where the powder will be fused. In some implementations, the feed delivery system is configured to deliver feed material across a region that spans the width of the support 102. For example, the feed delivery system can include a dispenser that spans the width of the support 102, and scans across the length of the support to deliver the layer of feed material. The dispenser could include simply permit feed material to flow through an aperture under the influence of gravity, or the dispenser could be ejector that ejects the powder from one or more nozzles.

In the implementations shown in FIGS. 1A and 1B, the feed material 130 is held in one or more reservoirs 120 adjacent the support 102. Although FIGS. 1A and 1B illustrate the system 100 with two reservoirs 120a, 120b positioned on opposite sides of the platen 105, the system could include just one reservoir. Each reservoir 120 can be defined by a vertically movable support plate 122 surrounded by side walls 124. The mechanism for displacing the support plate 122 can be a linear actuator connected to the support plate 122 by a piston rod 107b.

The feed material 130 can be pushed from the reservoir 120 across the platen 105 by moving the reservoir 120 up (+z direction), e.g., by a distance that is sufficient to provide an amount of powder above the wall 124 sufficient to coat the platen 105 or underlying layer. Then a spreader 140, such as roller or a blade, pushes the feed material off the support plate 122 and across the platen 105. The spreader 140 can span the width of the support 102.

Various energy sources can be used to heat the feed material used in the additive manufacturing system 100. For example, the reservoir can include a heater, such as a resistive heater embedded in the support plate 122 or a lower lamp array 126 below the support plate 122, to heat the support plate and the feed material 130 that is in the reservoir 120 above the support plate 122. Alternatively or in addition to any heater in or below the support plate 122, in some implementations, the system 100 can include a heat source 135 positioned to apply heat radiatively to the feed material 130 in the reservoir 120. The heat source 135 can be positioned so that it does not supply heat to the layer of feed material over the platen 105. The heat source 135 can be a heat lamp, e.g., an IR lamp 135. In implementations with two or more reservoirs 120a, 120b, an IR lamp 135 can be placed above each reservoir.

As noted above, the feed material 130 can be fused by sufficiently raising its temperature (and then being cooled if necessary, e.g., to solidify a liquefied feed material). For example, in the case of a powder, the powder can be sintered when heated to a sintering temperature. The temperature of the feed material 130 can be raised from the room temperature to the sintering temperature by heating the feed material 130 by one or more energy sources that heat the feed material in succession. For example, the feed material can be heated to a "free-flowing temperature" before being deposited onto the platen. Once deposited on the platen, the entire layer of deposited feed material can be further heated. For example, the entire layer of feed material can be raised to a "caking temperature" which is sufficient for the powder to become tacky or viscous, but below the temperature at which the feed material fuses. Finally, the deposited feed material can be selectively heated to the fusing temperature, e.g., the sintering temperature.

The total heat from the heat source 135 and/or heater in or below the support plate 122 is sufficient to raise the temperature of the feed material 130 from room temperature, i.e., around 20-26° C., to the "free flowing temperature" which is higher than room temperature but not so high that the powder becomes tacky or viscous. This permits the feed material to be dispensed over the platen at an elevated temperature. This reduces the temperature variation needed for sintering and the power needed by other heating components, but does not interfere with the dispensing process.

The temperature of the top layer of the feed material deposited on the platen 105 can be raised from the "free flowing temperature" to a "caking temperature" by supplying heat to it by one or more energy sources. For example, the support 102 can optionally include a heater, such as a resistive heater embedded in the platen 105 or a lower lamp array 109a below the platen, to heat the platen and the feed material 130 that has been deposited on the platen 105. Alternatively or in addition to any heater in or below the platen 105, in some implementations, the system 100 can include a first heat source 155 positioned to apply heat radiatively to the feed material 130 on the platen 105.

As noted above, in order to fuse the desired portions of the deposited feed material, its temperature needs to be raised, e.g., to a sintering temperature for a powder. If the temperature of the layer of feed material 130 over the platen 105 is at the caking temperature, additional energy sources, e.g., the second heat source 160, is used to heat the feed material to the sintering temperature.

The second heat source 160 can be, for example, a laser to generate a laser beam 175. Alternatively, the second heat source 160 can be an electron source to generate an electron beam 175. The beam 175 can scan over the layer of feed material, the power of the beam can be modulated to selectively fuse, e.g., sinter, portions of the layer of feed material.

The second heat source 160 includes a beam source 170 (that produces a beam 175), an actuation system 165, and an optical system 167. The beam 175 can, for example, be a laser beam or an electron beam. The actuation system 165 can translate the beam 175 in the x-y plane to scan the top surface of the feed material. For example, the actuation system 164 can include a galvo-controlled mirror to deflect the laser beam at a desired angle, or the actuation system 164 can include an actuator that moves the beam source 170 relative to the platen 102.

In some implementations, the actuation system 165 can be configured to translate the beam source 170 in the Z direction which can allow the control of the shape of the spot size of the beam 175 on the top layer of the feed material. The optical components 167 can also control the depth of focus and/or the spot size of the laser beam 175 on the top surface of the feed material.

Throughput of the system 100, can be increased by applying several techniques. For example, as described above, feed material 130 in the reservoir can be heated from the room temperature to the "free flowing temperature" by a combination of heat source 135, resistive heater embedded in the support plate 122 and a lower lamp array 126. Heating the feed material prior to deposition onto the platen 105 can help reduce the time needed to fuse the deposited feed material.

Throughput of the system 100, can also be increased by having two reservoirs 120a and 120b positioned on opposite sides of the platen which allow feed material to be alternately dispensed. For example, the spreader 140 can be moved in a first direction from the reservoir 120a at the left end of the platen 105 to the reservoir 120b at the right end of the platen 105, and in the process spreading a layer of the feed material 130 from the reservoir 120a over the platen 105. After that layer has been processed, another layer of feed material can be dispensed by moving the spreader 140 in an opposite second direction from the reservoir 120b to the reservoir 120a, and in the process spreading another layer of feed material.

Throughput of the system 100 can also be increased by having a coolant dispenser to regulate the temperature of the feed material 130 deposited on the platen 105. For example, after a layer of feed material has been deposited and fused, it may be desirable to cool the fused feed material before processing the next layer of feed material. Cooling the feed material prevents the heat from the fused feed material from changing the temperature of the surrounding feed material. This can, for example, reduce accidental sintering or melting of the next layer of feed material. This can also, for example, reduce the spatial temperature fluctuations across and between the layers of deposited feed material, and thus reduce thermal stress and thereby improve material properties. The coolant dispenser can, for example, be an air knife that dispenses air or some other gas, e.g., nitrogen.

The spreader 140 and the coolant dispenser 145 can be coupled to or mounted on one or more drive mechanisms (for example actuators) that can be controlled by one or more controllers (for example, controller 190). Thus, the roller 140 and the coolant dispenser 145 can move relative to the platen, e.g., scan along the length of the platen (in the y-direction). The spreader 140 and the coolant dispenser 145 can be mounted on separate actuators which can allows them to move relative to each other and relative to the beam 175.

The spreader 140 and the coolant dispenser 145 can move relative to or in conjunction with the beam 175. In some implementations, the spreader 140, dispenser 145 and beam 175 scan across the platen 105 in a scanning direction, e.g., left to right. In some implementations, the spreader 140, coolant dispenser 145 and beam 175 move relative to the platen 102 but in conjunction with one another such that the spreader 140 is ahead of the coolant dispenser 145 (in the direction of motion of the spreader 140, dispenser 145 and beam 175) while the beam 175 sinters the feed material between the two.

The dispenser 145 can include a conduit that can simultaneously dispense coolant fluid across the width of the platen (along x direction). The conduit can have a contiguous slot or multiple apertures that are spaced apart and extend over the width of the platen.

Figure 2A:
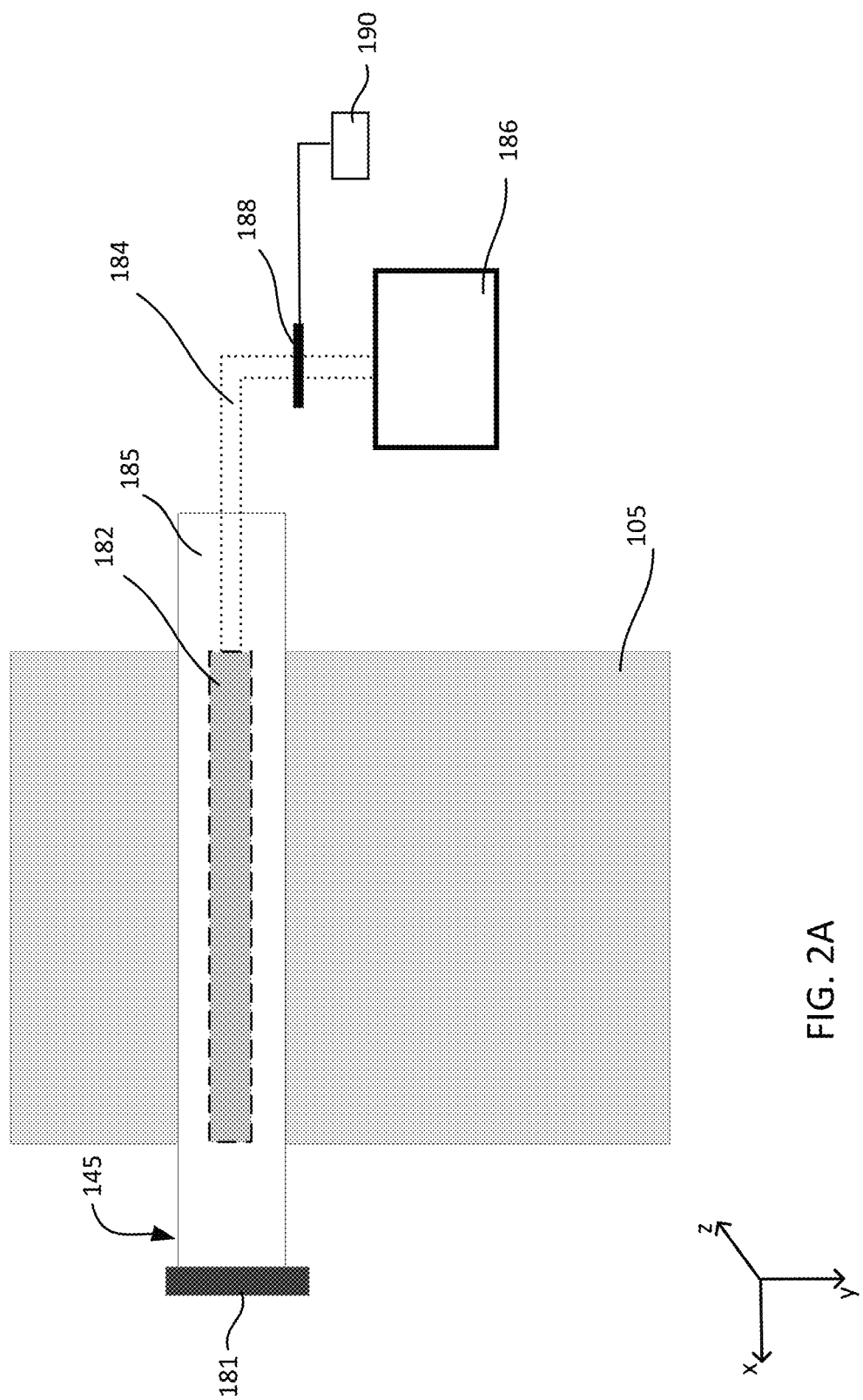
FIGS. 2A-2C are schematic top views of embodiments of coolant dispenser systems.

FIG. 2A illustrates an implementation of a dispenser 145 that includes a conduit 185 coupled to an actuator 181. The conduit 185 can have a contiguous slot 182 and is coupled to a coolant fluid source 186 via connector 184, e.g., flexible tubing.

Figure 2B:
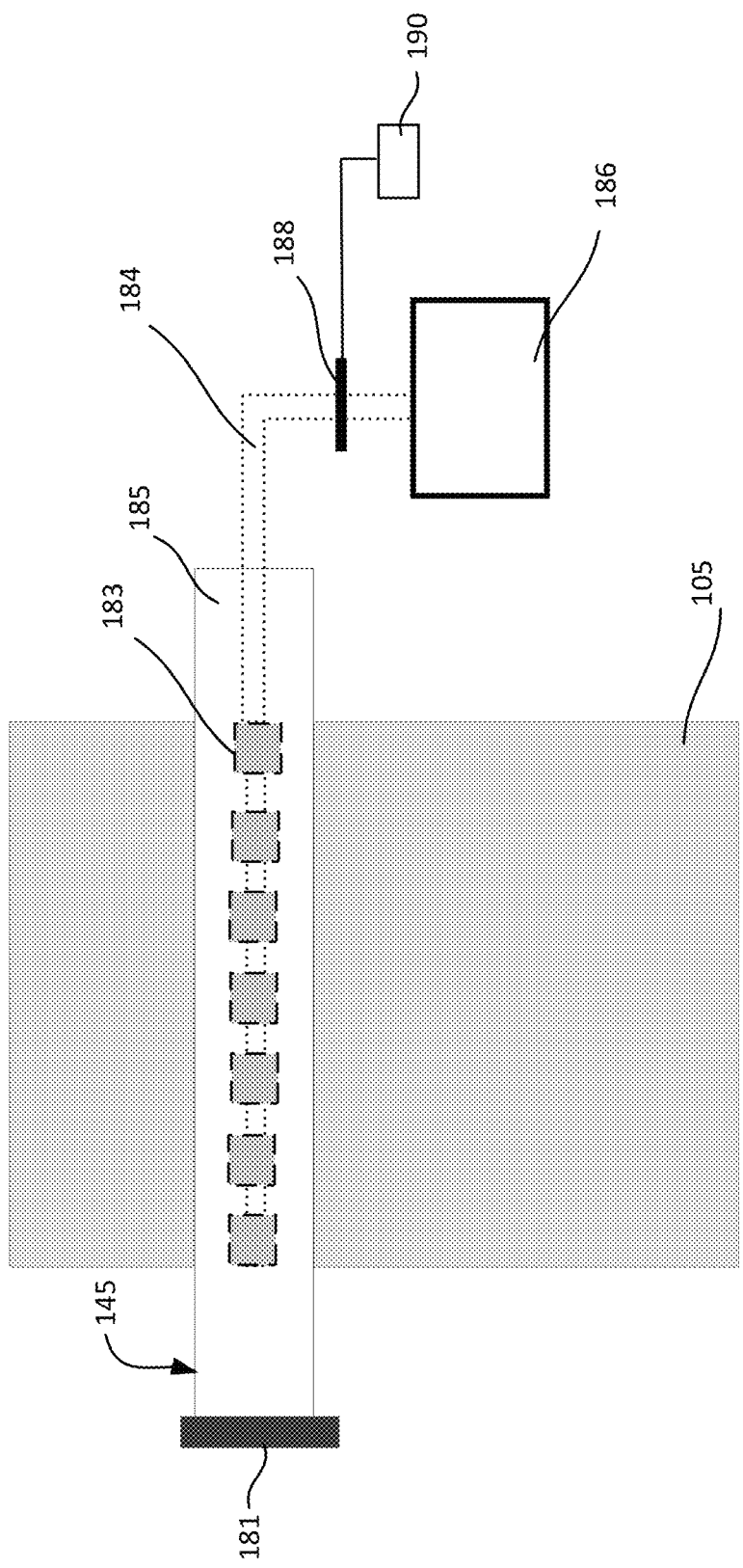

FIG. 2B illustrates an implementation of a dispenser 145 in which the conduit 185 has multiple apertures 183. The conduit and apertures 183 are coupled to a coolant fluid source 186 via a common connector 184, e.g., flexible tubing.

Figure 2C:
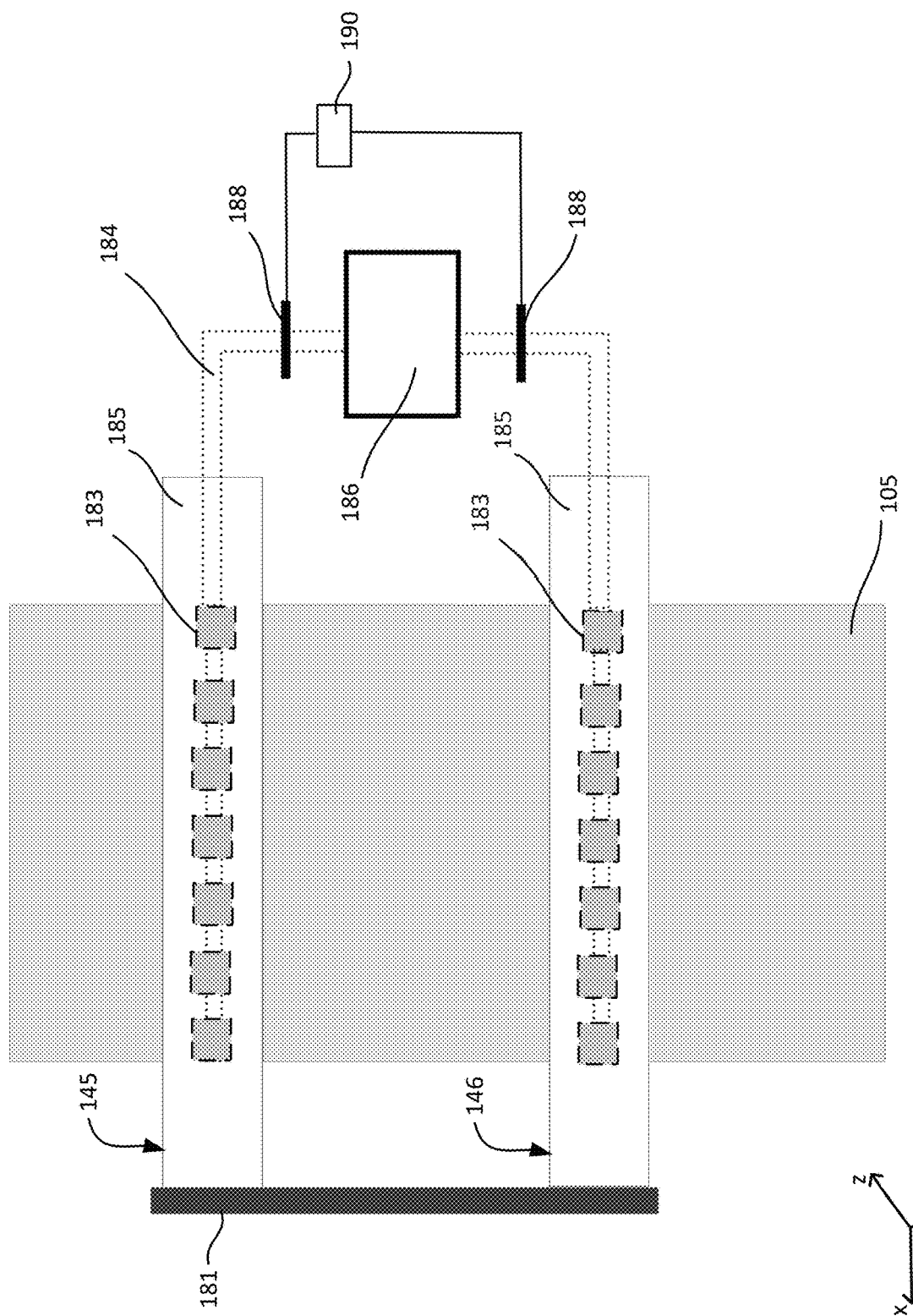

As shown in FIG. 2C, the additive manufacturing system 100 can also have more than one coolant dispenser, e.g., dispensers 145 and 146. The dispensers can extend in parallel across the platen 105.

The coolant fluid can be a gas, e.g., air or nitrogen. In some implementations the fluid can be a liquid, e.g., a fast-evaporating liquid such as isopropyl alcohol. The fluid can be refrigerated, e.g., below room temperature, before being dispensed.

Depending on the dispensing mechanism and control of the fluid flow, the coolant fluid emerges continuously or intermittently from the slot or the aperture in the conduit onto the feed material. The rate of flow of the coolant fluid thought the contiguous slot or apertures can also be adjusted by controlling the pressure of the coolant fluid with a pressure regulator 188 that is controlled by a controller 190. Alternatively, the flow rate of the coolant fluid can be controlled by a pump (not shown). Control of the temperature and flow rate of coolant fluid can allow control over the rate of cooling of the feed material. The coolant fluid dispenser is configured to deliver coolant fluid at a temperature and mass flow rate sufficient to ensure that accidental fusing of the subsequently deposited layer does not occur.

However, the flow rate of coolant fluid should be low enough that powder in the layer that was not fused is not significantly disturbed. For example, the flow rate can be selected to avoid blowing the unfused powder across other areas of the platen.

The coolant dispenser 145 can be coupled to an actuator that can move the dispenser toward and away from the platen 105. This can, for example, serve as a control to regulate the cooling of the feed material, and provide greater flexibility in arranging the various components of the additive manufacturing system 100.

FIG. 1A illustrates a coolant dispenser 145 that can dispense coolant onto the feed material deposited on the platen 105. The coolant dispenser 145 extends along and across the width of the platen 105 (in the x direction). Further, the system 145 is mounted or attached to an actuator 181 (see FIG. 2A-2C) that allows it to traverse the length of the platen 105 (along y direction). The actuator 181 can also be configured to move the coolant dispenser 145 in the vertical z direction.

In the embodiment shown in FIG. 1A, the roller moves from left to right depositing a layer of feed material on the platen. The desired portions of the layer of feed material is fused by the beam 175 which scans over the layer. Then, the coolant dispenser 145 traverses the platen.

The relative motion of the spreader 140, the beam 175 and the coolant dispenser 145 can be controlled by one or more controllers 190. The coolant dispenser 145 can, for example, begin traversing the platen 102 before the beam 175 has finished scanning over the layer of feed material. In other words, the coolant dispenser 145 can follow the beam 175 as the latter traverses across the platen. Alternatively, the coolant dispenser 145 can begin traversing over the platen 102 after the beam 175 has traversed across the platen 105 and heating of the entire layer of feed material is completed.

Once the spreader 140 and the coolant dispenser 145 (and beam source if it is movable) have scanned along the platen 102, then can be returned to the starting side to begin processing of another layer.

FIG. 1B is another implementation of the additive manufacturing system that contains two coolant dispensers 145 and 146 that are arranged along the width of the platen (x direction), and can traverse the length of the platen (along y direction). The two dispensers are mounted on separate actuators and controlled by one or more controllers 190. The motion of the two coolant dispensers over the platen can be configured in several ways.

As one example, once the entire layer of feed material has been deposited and fused by the spreader 140 and the beam 175, respectively, the coolant dispensers 145 and 146 can simultaneously begin traversing from left to right and right to left, respectively. In this example, the positions of the two coolant dispensers 145, 146 are exchanged after processing one layer of feed material. In this configuration, the two dispensers need to be arranged such that they do not collide. This can be done by configuring the actuators to move the dispensers 145, in the z-direction such that the two dispensers are in different horizontal planes. The simultaneous motion of the two coolant dispensers permits the system to cool the feed material faster.

As another example, the two dispensers 145, 146 can alternately traverse over the platen. For example, the roller 140, beam 175 and the coolant dispenser 145 traverse from left to right depositing, fusing and cooling, respectively, a first layer of feed material, followed by the roller 140, the beam 175 and the coolant dispenser 146 traversing from right to left depositing, fusing and cooling, respectively, a second layer of feed material. Therefore, in this example, the positions of the coolant dispensers 145 and 146 are exchanged after processing two layers of feed material.

In yet another implementation, the roller 140, the beam 175 and the coolant dispenser 145 traverse from left to right depositing, fusing and cooling, respectively, a first layer of feed material followed by the coolant dispenser 145 traversing back from right to left further cooling the feed material. Then the roller 140, the beam 175 and the coolant dispenser 146 traverse from right to left depositing, fusing and cooling, respectively, a second layer of feed material followed by the coolant dispenser 146 traversing back from left to right further cooling the feed material. In this example, the coolant dispensers 145, 146 return back to their original positions after the processing of a layer of feed material.

In some implementations, as shown in FIG. 2C, the two coolant dispensers 145 and 146 are coupled to a common actuator 181. As a result, coolant dispensers 145 and 146 move in conjunction with each other. Additionally, the two coolant dispensers can also move in conjunction with or relative to the beam 175.

To operate this system, when the coolant dispensers move across the platen, coolant fluid is dispensed only through the leading dispenser. For example, when the dispensers move in the positive y direction (i.e. downwards in FIG. 2C), coolant fluid is only dispensed through the dispenser 146.

In some implementations, the additive manufacturing system can include a platen to receive feed material, a material dispenser system that can dispense one or more feed materials, one or more heat sources that can heat the deposited feed materials, and a coolant dispenser to dispense coolant fluid onto the feed material. The heat sources can include heat lamp arrays and resistive coils embedded in the platen. The material dispenser and the coolant dispenser are mounted on one or more drive mechanisms (for example, actuators) that are controlled by one or more controllers 190. This allows the material dispenser system and the coolant dispenser to move relative to or in conjunction with one another.

Figure 3:
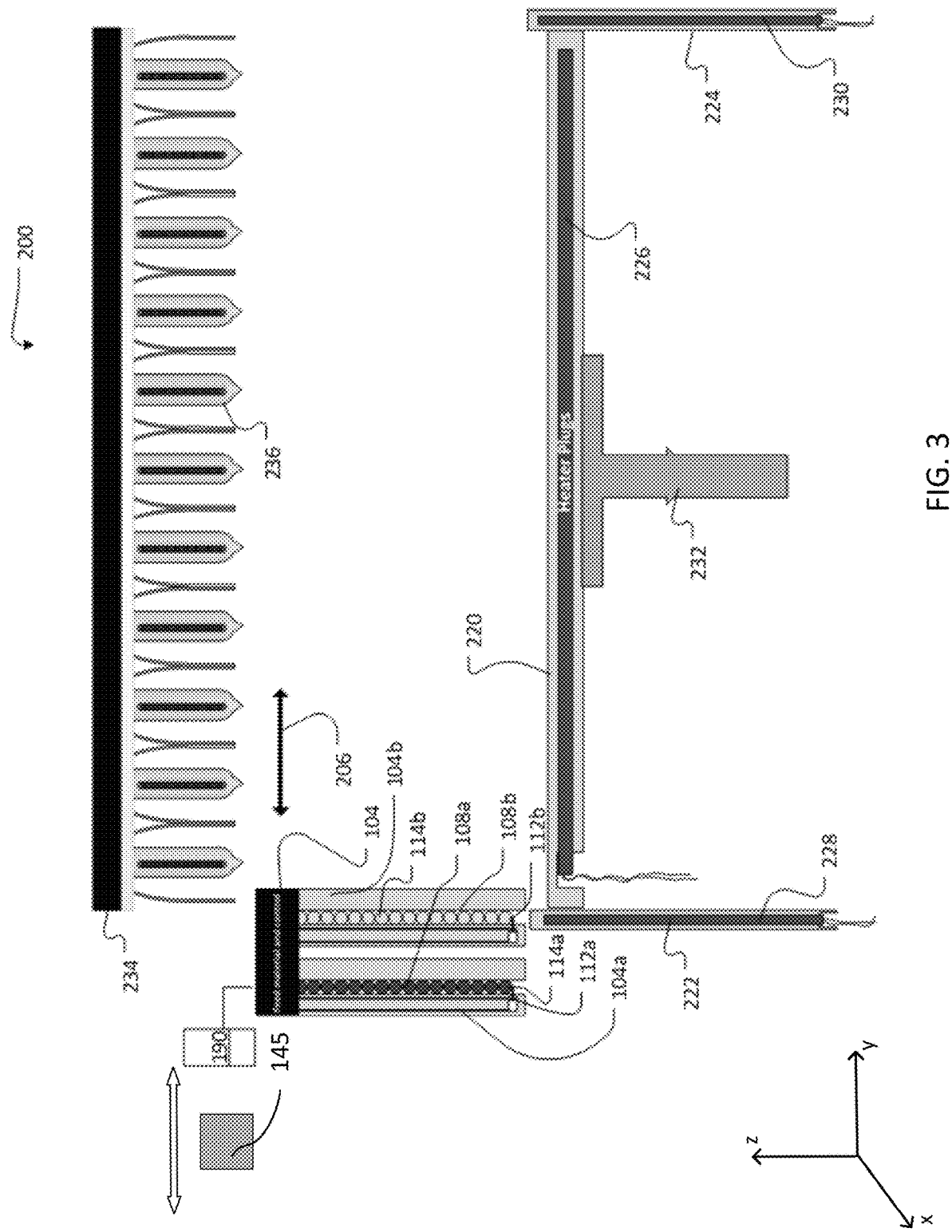
FIGS. 3-5 are schematic side views of embodiments of additive manufacturing systems.

FIG. 3 shows another implementation of an additive manufacturing system 200. The additive manufacturing system 200 includes a material dispenser 104 positioned above a platen 220. The vertical position of the platen 220 can be controlled by a piston 232. A controller 190 controls a drive system (not shown), e.g., a linear actuator, connected to the dispenser assembly 104. The drive system is configured such that, during operation, the dispenser assembly can traverse across the top surface of the platen 220 (along the y direction indicated by arrow 206).

As the dispenser assembly 104 traverses across the platen, it deposits feed materials at the desired location on the platen 220. The dispenser assembly 104 can store and dispense two or more feed materials. For example, the material dispenser assembly 104, includes a first dispenser 104a having a first reservoir 108a to hold first feed material 114a, and a second dispenser 104b having a second reservoir 108b to hold a second feed material 114b. The release of the first feed material 114a and the second feed material 114b is controlled by a first gate 112a and a second gate 112b, respectively. Gates 112a and 112b are controlled independently so that one of the two feed materials is deposited at a desired location on the platen 220. The controller 190 directs the dispenser assembly 104 to deposit either the first feed material 114a or the second feed material 114b at locations on the platen according to a printing pattern that can be stored as a computer aided design (CAD)-compatible file that is then read by a computer associated with the controller 190

In some implementations, each dispenser 104a and 104b includes a plurality of openings through which feed material can be dispensed. For example, each dispenser can have multiple opening that extends across the width of the platen (x direction). In this case, in operation, the dispensers 104a, 104b can scan across the platen 220 in a single sweep in the direction 206 (along y axis). In another embodiment, each dispenser can have a single opening. In this case, the dispensers 104a, 104b can scan both along the breadth and length of the platen 220 (along the x and y direction, respectively), e.g., a raster scan across the platen 220. In both the aforementioned embodiments, each opening can have an independently controllable gate, so that delivery of the feed material through each opening can be independently controlled.

During manufacturing, layers of feed materials are progressively deposited and fused, e.g., sintered or melted. For example, the first and second feed materials 114a and 114b are dispensed from the material dispenser 104 to form a first layer. The second feed material 114b can have a higher sintering or melting point than the first feed material 114a. If the layer of feed material comprising both feed materials is heated to a temperature above the sintering temperature of the first feed material but below that of the second feed material, the deposited cluster of first feed material 114a can fuse together whereas the second feed material 114b remains in loose (i.e., powder) form.

The system 200 includes a heat source 234 configured to raise the temperature of an entire deposited layer simultaneously. For example, the heat source 234 can be a two-dimensional array of heater lamps 236. As illustrated in FIG. 2 the heat source 234 can be positioned above the platen, i.e., on the same side of the platen 220 on which the feed material is deposited, and spaced away sufficiently from the platen 220 so that the dispensers 104a and 104b, and the coolant dispenser 245 can pass between the platen 120 and the heat source 234.

The platen 220 can also be heated by another heat source, for example, an embedded heater 226, to a base temperature that is below the melting points of both the first and second feed materials. The heat source 234 is triggered to impart sufficient energy to melt the first feed material without melting the second feed material. In this way, the heat source 234 can be configured to provide a smaller temperature increase to the deposited material to selectively melt the first feed material. Transitioning through a small temperature difference can enable each deposited layer of feed materials to be processed more quickly. For example, the base temperature of the platen 120 can be about 1500° C. and the heater source 234 can be triggered to impart energy to cause a temperature increase of about 50° C.

Alternatively, the heat source 234 could be used to heat the platen 220 to the base temperature, and the embedded heater 226 could be triggered to impart sufficient energy to melt the first feed material without melting the second feed material. The platen 220 can include side walls 222 and 224 that are each heated by heaters 228 and 230, respectively.

As shown in FIG. 3, the material dispenser 104 traverses the length of the platen (along the y direction, e.g., from left to right) depositing a layer of feed material that comprises the first and the second feed material. The heat source 234 can be triggered after a layer has been deposited by the dispensing system 190. The deposited layer of feed material is heated by the heat source 234 for a duration of time needed to impart sufficient energy to fuse the first feed material, without fusing the second feed material. Then the heat source 234 is switched off and the coolant dispenser 245 traverses from left to right dispensing coolant fluid onto the layer of feed material.

The coolant dispenser 245 can include a conduit to simultaneously dispense coolant fluid across the width of the platen through a contiguous slot or through multiple apertures arranged along the width of the platen. A coolant fluid emerges continuously or intermittently from the slot or the aperture onto the feed material. The rate of flow of the coolant fluid can also be adjusted by controlling the size of the slots and apertures by a controller 190. The process of deposition, fusing and cooling of feed material is repeated as the dispenser 104 and the coolant dispenser 245 traverse from right to left.

The material dispenser 104 and the coolant dispenser 245 can be mounted on separate drive mechanisms (for example, actuators) that are controlled by one or more controllers 190. This configuration can allow the assembly 104 and the dispenser 245 to move relative to one another. In one embodiment, the coolant dispenser 245 can traverse the length of the platen several times dispensing coolant onto a layer of feed material until a desired temperature distribution is achieved. For example, it may be desirable to cool the layer of deposited feed material until the temperature of the entire or a part of the layer falls below the sintering temperature of both the first and the second feed material.

Figure 4:
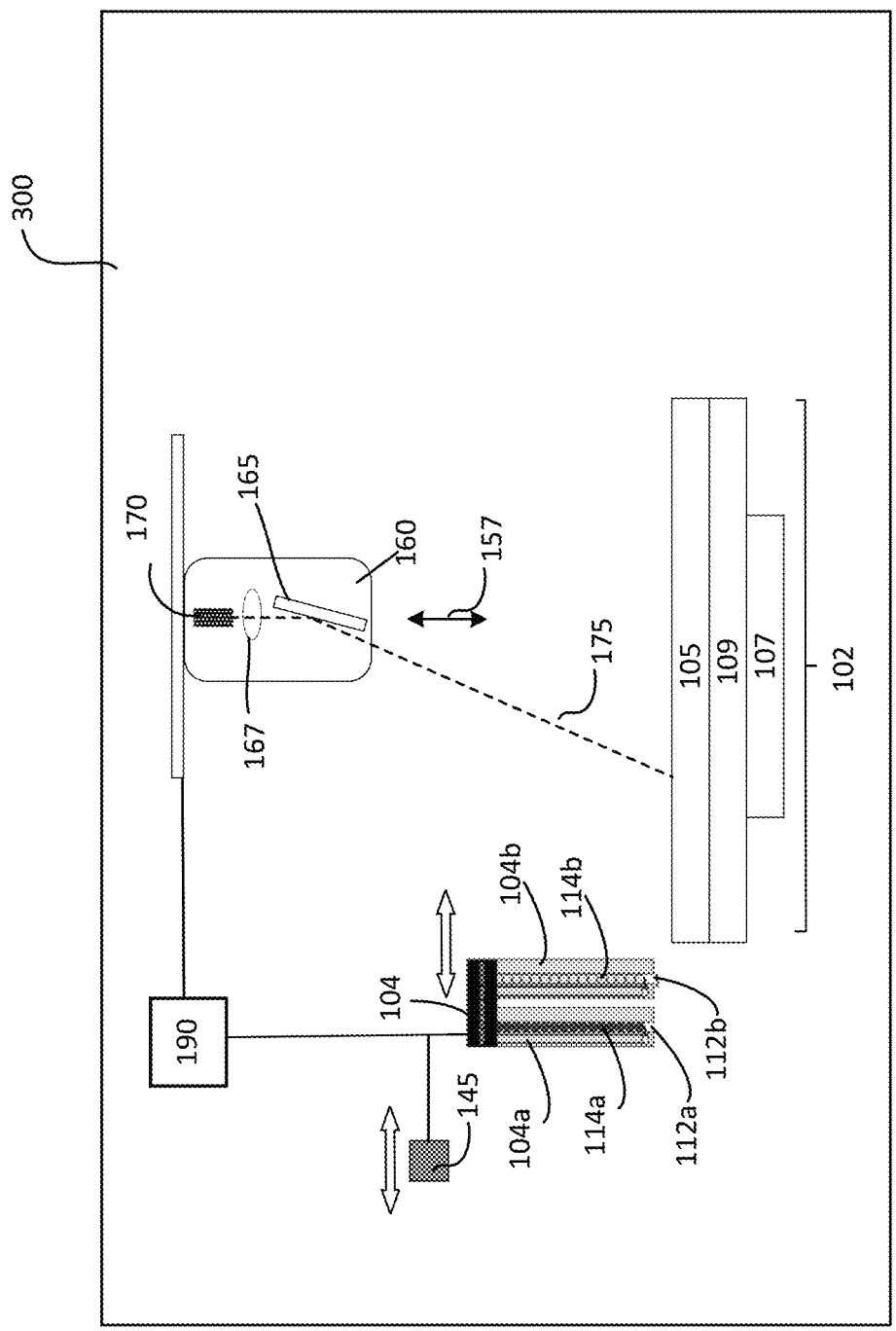

FIG. 4 illustrates an implementation of an additive manufacturing system 300 that includes a material dispenser 104 and a platen 105, held by a support 102, to receive the feed material. The material dispenser can traverse the length and breadth of the platen 105 depositing feed materials 114a and 114b that sinter/melt at different temperatures. The support 102 comprises a lower lamp array 109 to heat the platen and a piston 107 to move the platen 105 in the vertical direction. The system can also have a second heat source 160 configured to generate a beam 175 to scan over the layer of feed material deposited on the platen 105. The heat source 160 includes a beam source 170, an actuation system 165, and an optical system 167. The system 300 also includes a coolant dispenser 145 to dispense coolant fluid onto the feed material deposited on the platen 105.

The first and second feed materials 114a and 114b can have different sintering temperatures. For example, the first feed material can have a lower sintering temperature. In one embodiment, the lower lamp array heats the deposited layer of feed material to a temperature that is below the sintering temperatures of both the first and the second feed materials. Then, the beam 175 from the source 160 scans over the layer of deposited feed material providing the incremental energy needed to sinter the first feed material.

The dispenser 145 can include a conduit that can simultaneously dispense coolant fluid across the width of the platen (along x direction). The conduit can have a contiguous slot or multiple apertures that are spaced apart and extend over the width of the platen. A coolant fluid emerges continuously or intermittently from the slot or the aperture onto the feed material.

The material dispenser 104 and the coolant dispenser 145 can be coupled to or mounted on one or more drive mechanisms (for example actuators) that can be controlled by one or more controllers 190. Further, the material dispenser 104 and the coolant dispenser 145 can move relative to or in conjunction with the beam 175. For example, the material dispenser 104 and the coolant dispenser 145 can be mounted on separate actuators which can allows them to move relative to each other and relative to the beam. In other implementations, the material dispenser 104 and the coolant dispenser 145 do not move relative to each other: the assembly 104 is ahead of the coolant dispenser 145 while the beam 175 sinters the feed material between the two.

In some implementations, the coolant dispenser 145 traverses over the platen 105 after the beam 175 has finished scanning over the entire layer of deposited feed material. For example, once a new layer of feed material that includes the first and the second material has been deposited, the beam 175 can scan from left to right sintering the desired portions of the deposited layer. After the beam 175 has completed scanning over the entire surface, the coolant dispenser 145 can traverse from left to right dispensing coolant over the layer of feed material.

The coolant dispenser 175 can be configured to traverse over the entire layer or a part of the layer of deposited feed material. For example, a sensor can monitor the temperature of the surface of the deposited feed material and a control system can regulate the path of the coolant dispenser based on the signal from the sensor. The path of the coolant dispenser can include traversing over the entire layer of deposited feed material several times until a desired temperature distribution is achieved. The control system can also regulate the rate of flow of coolant fluid from the coolant dispenser.

Figure 5:
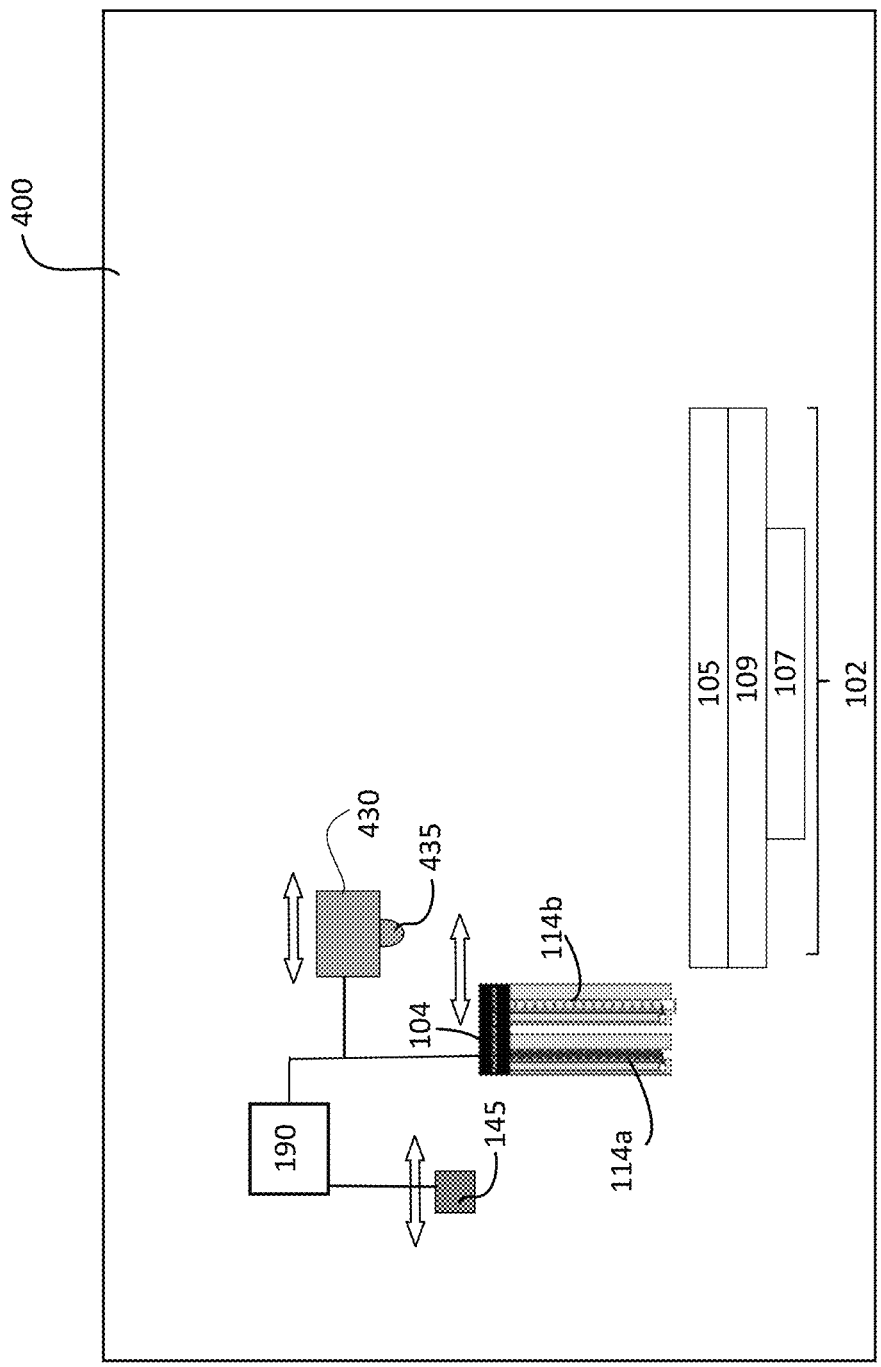

FIG. 5 illustrates an implementation of an additive manufacturing system that includes a platen 105 (supported by a support 102) that can receive feed materials from a material dispenser 104. The dispenser assembly 104 can traverse across the platen and deposit a first feed material 114a or a second feed material 114b at desired locations on the platen. The feed materials 114a and 114b have different sintering temperatures. The support 102 comprises a lower lamp array 109 to heat the platen and a piston 107 to move the platen 105 in the vertical direction. The system can also have a second heat source 430 that extends across the width of the platen (along x direction). The heat source 430 includes a linear array of heat lamps 435 and can traverse across the platen (along y direction).

The system 400 also includes a coolant dispenser 145 that can include a conduit that can simultaneously dispense coolant fluid across the width of the platen (along x direction). The conduit can have a contiguous slot or multiple apertures that are spaced apart. A coolant fluid emerges continuously or in bursts from the slot or the aperture onto the feed material. The rate of flow of the coolant fluid can also be adjusted by controlling the size of the slots and apertures by a controller 190.

The material dispenser 104, the heat source 430 and the coolant dispenser 145 can be mounted on one or more drive mechanisms (for example actuator) that can be controlled by one or more controllers 190. For example, the assembly 104, the heat source 430 and the dispenser 145 can be mounted on separate actuators which can allows them to move relative to each other. The actuators can be controlled by one or more controllers that can communicate with each other. In some implementations, any two of the dispenser assembly 104, heat source 430 and coolant dispenser 145 can be mounted on one actuator that allows the two to traverse the platen without moving relative to each other.

The material dispenser 104 can traverses across the platen and deposit the first and the second feed material at the desired locations on the platen. The layer of deposited feed material can be heated to a temperature below the sintering temperatures of the first and second feed material by the lower lamp array 109 or resistive coils in the platen 105. Then the heat source 430 traverses across the platen (along y direction). As the heat source 430 traverses across the platen, the linear strip of feed material that lies substantially below the heat source is heated to a temperature that is higher than the sintering temperature of the first feed material but lower than that of the second feed material. As a result, the first feed material is sintered, while the second remains in powder form. The heat source can also be configured to heat only desired portions of the deposited feed material. For example, the heat source can be "switched on" only when it is above certain regions of the deposited feed material.

The feed material in additive manufacturing systems 100, 200, 300 or 400 can be a dry powder of metallic or ceramic particles, metallic or ceramic powders in liquid suspension, or a slurry suspension of a material. Examples of metallic particles include titanium, stainless steel, nickel, cobalt, chromium, vanadium and various alloys of these metals. Examples of ceramic materials include metal oxide, such as ceria, alumina, silica, aluminum nitride, silicon nitride, silicon carbide, or a combination of these materials.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK), polystyrene, polyurethane, acrylate, epoxy, polyetherimide, or polyamides.

The controller 190 of systems 100, 200, 300 or 400 is connected to the various components of the system, e.g., actuators, valves, and voltage sources, to generate signals to those components and coordinate the operation and cause the system to carry out the various functional operations or sequence of steps described above. For example, the controller 190 can control components of additive manufacturing systems like coolant dispenser 145, roller/blade 140, material dispenser 104. The controller 190 can also control the location and intensity of the laser beam 175.

The controller 190 can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

As noted above, the controller 190 can include non-transitory computer readable medium to store a data object, e.g., a computer aided design (CAD)-compatible file, that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 190, e.g., as controlled by firmware or software, can interpret the data object received from the computer to generate the set of signals necessary to control the components of the system to print the specified pattern for each layer.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a non-transitory machine readable storage medium or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

A sensor can detect the temperature of the surface of deposited feed material and the controller 190 can regulate the coolant dispenser based on the signal from the sensor to achieve a target temperature.

For any of the systems described, the coolant dispenser can be configured to dispense coolant fluid over desired portions of the feed material rather than the entire later of deposited feed material. Heating and cooling of desired portions of the deposited feed material can provide better control of the additive manufacturing process. For example fluctuation of temperatures experienced by particular regions of the deposited feed material can be controlled. This can improve the quality of the additive manufacturing process.

A number of implementations have been described. However, certain features can be combined for advantageous affect, without including other features. For example, the following combinations are possible:

The coolant dispenser can traverses over the length of the platen dispensing coolant fluid before the deposition (and fusing) of a layer of feed material. This is done to control the temperature of the previously deposited layer of feed material.

The coolant dispenser can dispense coolant fluid over the length of the platen several times until a desired temperature of the deposited feed material is achieved.

The additive manufacturing system can have multiple coolant dispensers configured to cool the deposited feed material.

The temperature of the entire layer of the feed material can be raised to the free flowing temperature before the feed material is dispensed, and then the temperature of the layer of feed material can then be selectively increased to the fusing temperature, without raising all of the layer of feed material to the caking temperature. In this case, the first heat source can be optional.

The temperature of the entire layer of the feed material on the platen can be raised to the caking temperature without deliberately raising the temperature of the feed material before it is dispensed. In this case, the heater for the reservoir can be optional.

The lamp array surrounding the second heat source can be used to raise the temperature of the feed material, but not above the caking temperature.

The lamp array surrounding the second heat source can remain stationary rather than rotating.

The lamp array can be positioned above the platen but at a height lower than the energy source while still being considered positioned "around" the energy source.

If the feed material is selectively deposited, e.g., by a dispenser having an array of controllable openings, then the entire layer of feed material can be raised to the fusing temperature simultaneously, e.g., by a lamp array.

In addition, it will be understood that various modifications may be made. Accordingly, other implementations are within the scope of the following claims.

What is claimed is:

1. An additive manufacturing system, comprising:
   a platen having a top surface to support an object being manufactured;

a support structure;

a powder dispenser coupled to the support structure and positioned above the platen and configured to deliver a powder in a first linear region that extends along a first axis, a gas dispenser coupled to the support structure in a fixed position relative to the powder dispenser and having an outlet to deliver a gas across an outermost layer of powder;

an energy source configured to selectively fuse the outermost layer of powder; and an actuator coupled to the support to move the support with the powder dispenser and the gas dispenser together along a second axis perpendicular to the first axis and parallel to the top surface such that the first linear region and the outlet sweep along the second axis to deposit the powder in a swath over the platen to provider the outermost layer of powder on the platen and to deliver the gas.

2. The system of claim 1, wherein the gas dispenser is configured to deliver the gas in a second linear region.

3. The system of claim 2, wherein the second linear region extends along the first axis.

4. The system of claim 2, wherein the gas dispenser includes a conduit having a plurality of spaced apart apertures for gas flow.

5. The system of claim 2, wherein the gas dispenser includes a conduit having a contiguous slot for gas flow.

6. The system of claim 2, wherein the second linear region extends across a width of the platen.

7. The system of claim 1, wherein the energy source is configured to generate a beam that scans across the outermost layer of powder.

8. The system of claim 7, wherein the energy source is configured to scan the beam along direction parallel and perpendicular to the second linear region.

9. The system of claim 7, wherein the energy source comprises a laser and the beam is a laser beam.

10. The system of claim 9, comprising a mirror to scan the laser beam across the platen.

11. The system of claim 10, wherein mirror is configured to deflect the laser beam to control a position of the laser beam on the outermost layer of powder along the first axis.

12. The system of claim 11, wherein the mirror comprises a mirror galvometer.

13. The system of claim 1, wherein the gas dispenser is configured to direct the gas along a direction perpendicular to the top surface.

* * * * *